Jan. 26, 1965     M. D. TUPPER     3,166,959
APPARATUS FOR MOUNTING BEARINGS IN A DYNAMOELECTRIC MACHINE
Original Filed Nov. 30, 1960     3 Sheets-Sheet 1
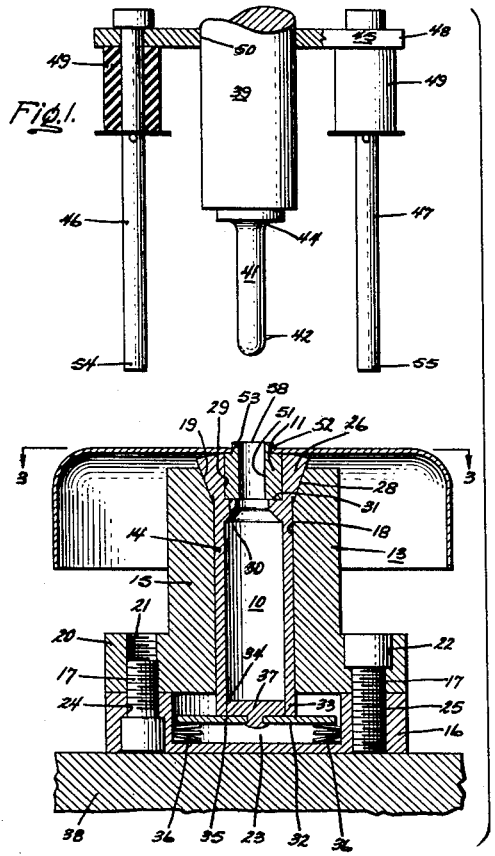
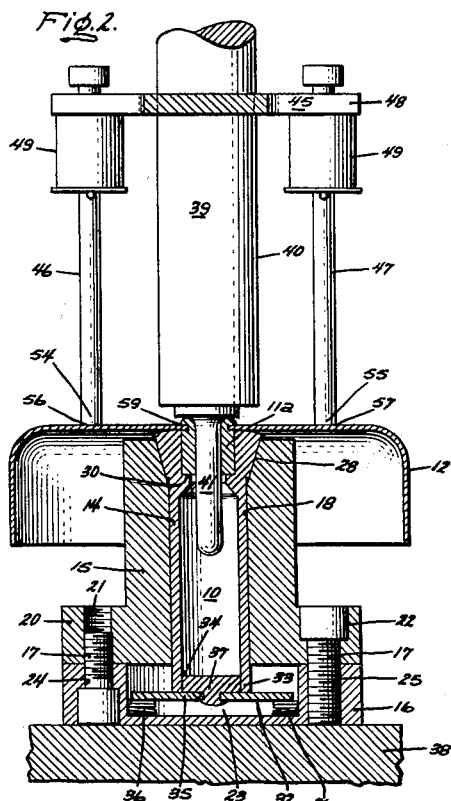
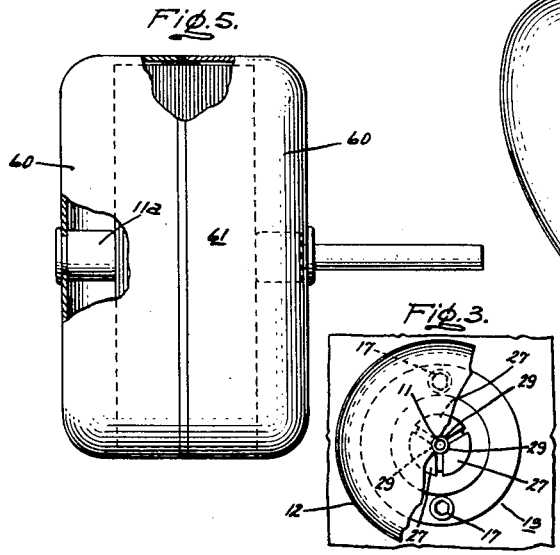
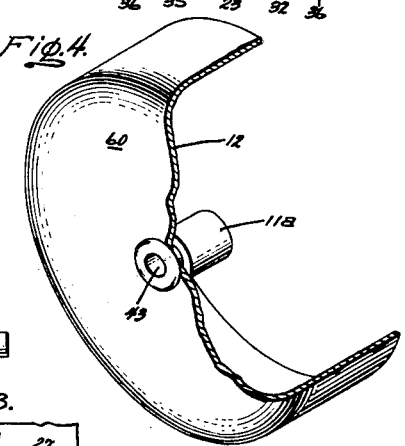
Inventor:
Myron D. Tupper,
by H. F. Manbeck, Jr.
Attorney.

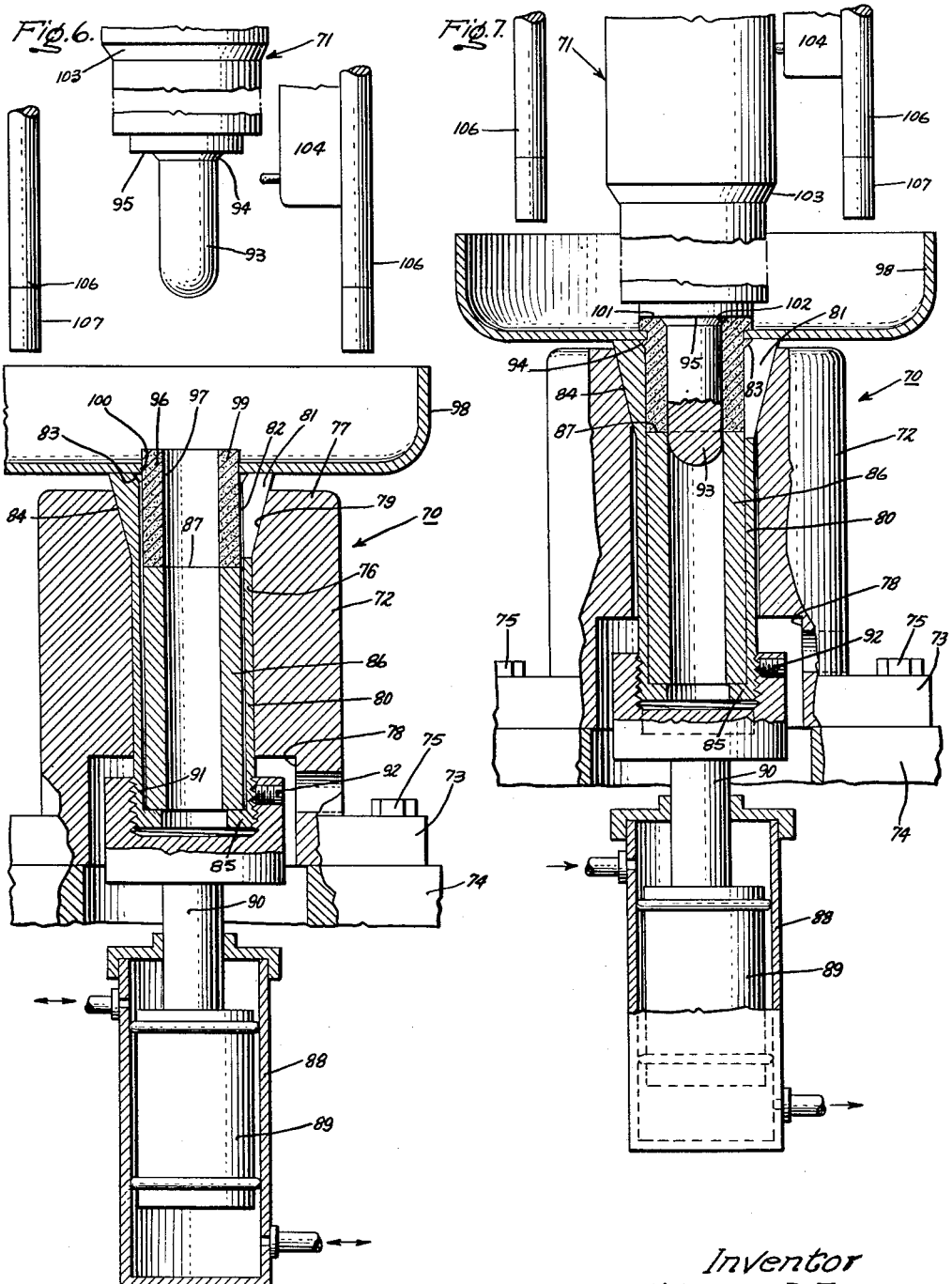

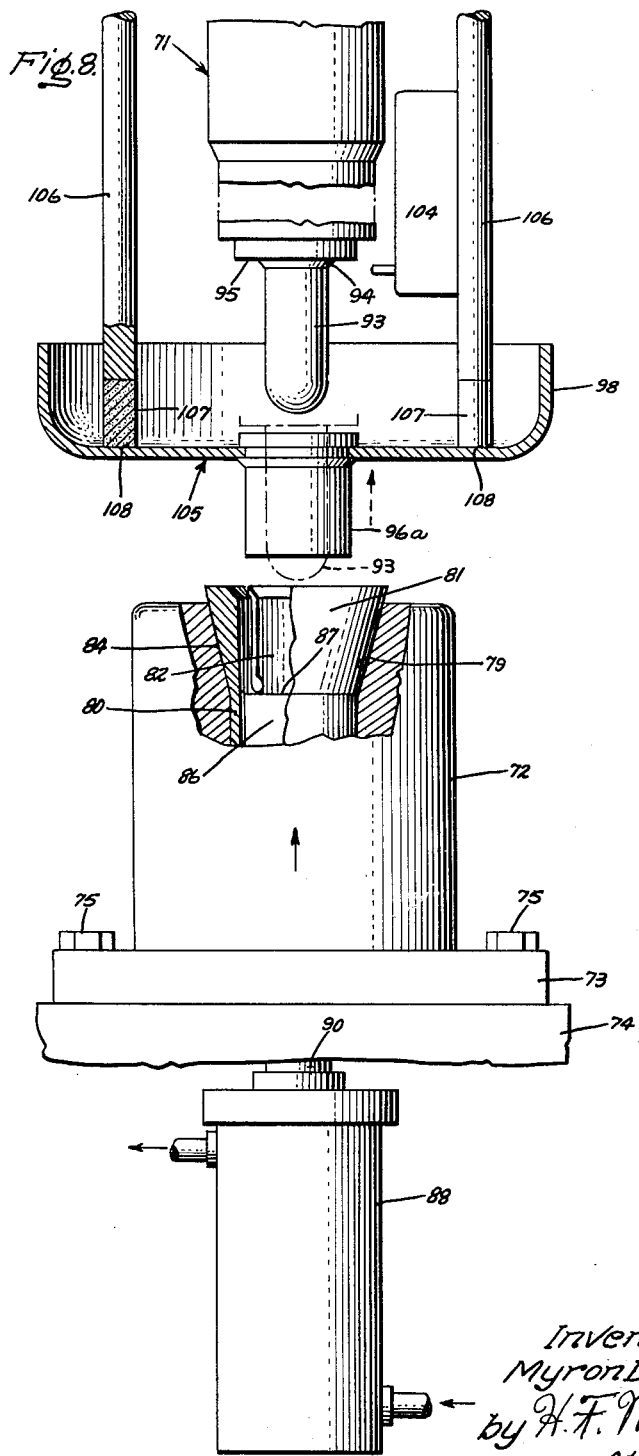

United States Patent Office 3,166,959
Patented Jan. 26, 1965

3,166,959
APPARATUS FOR MOUNTING BEARINGS IN A DYNAMOELECTRIC MACHINE
Myron D. Tupper, Fort Wayne, Ind., assignor to General Electric Company, a corporation of New York
Original application Nov. 30, 1960, Ser. No. 72,822. Divided and this application Sept. 28, 1961, Ser. No. 141,517
5 Claims. (Cl. 78—1)

The present invention relates to dynamoelectric machines, and more particularly, to an improved apparatus for mounting bearings in the same. This application is a division of my co-pending application Serial No. 72,822, filed November 30, 1960 for the Apparatus and Method for Mounting Bearings in a Dynamoelectric Machine, now abandoned, which, in turn, is a continuation-in-part of application Serial No. 772,276, filed November 6, 1958, now abandoned.

One common form of machine is the small and fractional horsepower induction motor type having a stator, a rotatable member or rotor, and a pair of end shield assemblies for rotatably supporting the rotor. The rotor is secured to a shaft, which is rotatably carried by a pair of bearings, one provided in each end shield assembly. As is well known in the dynamoelectric machine art, one important factor which directly affects machine performance; i.e., motor efficiency and premature bearing failures, is the degree of interference experienced by the revolving rotor shaft with the shaft carrying bearings. The interference is determined, to a great extent, by the alignment and journal friction of the rotor shaft with the bearings. Proper rotation of the shaft is especially significant in the operation of high speed motors.

One common end shield construction generally employed in fractional horsepower motors, is a simple and inexpensive arrangement in which one end of the bearing is directly secured to the end shield, providing the only means of support for the bearing. Although this construction is highly desirable from the standpoint of design and of low cost, previous methods of fastening the end of the bearing to the end shield and the apparatus used for assembly, have limited the degree of alignment and friction free journaling of the shaft and bearings obtained in the finally assembled machine, and therefore have not been wholly satisfactory. For example in one method a bearing, initially formed with a pre-sized accurately dimensioned bore, is finally assembled and secured onto the end shield by a staking process. But during the final assembly steps, the accurately finished bore or journal surface, attained during the prior manufacturing procedures, is to some extent destroyed, often rendered somewhat barrel shaped, and free rotation of the shaft within the bearing is impeded. This distortion may result in premature bearing failure as well as poor motor performance. Moreover, due to the fact that the bearing is secured and supported at only one of its ends in the end shield assembly, the place of securement is subjected to high stresses during motor operation and it has been found that a staked mounting does not provide a sufficiently strong means for rigidly holding the bearing onto the end shield. The bearing, therefore, has a tendency to become loose during motor operation, thereby causing misalignment of the bearings and shaft.

Thus, it is readily apparent that, although the simple construction, in which the bearing is mounted at its one end directly onto the end shield, is highly desirable for the reasons of cost and simple design, the method of assembly and apparatus used for such assembly have resulted in limitations on the quality of the end shield assembly produced thereby.

Accordingly, it is an object of the present invention to provide an improved apparatus for assembling and rigidly securing a bearing to a machine end shield, thereby producing an end shield assembly of excellent quality, yet low in cost.

It is a further object of this invention to provide an improved, yet low cost, apparatus for forming and finishing a sleeve type bearing while rigidly fastening it onto an end shield member composed of sheet material, thereby permitting the use of a relatively inexpensive unfinished bearing blank.

Yet another object is the provision of an improved and low cost apparatus, suitable for mass production manufacture, which not only rigidly mounts a molded sintered unfinished and relatively inexpensive sleeve type bearing onto an end shield member of sheet material by a staked or swedged arrangement, but also forms the bearing with an accurately dimensioned and smooth journal surface and, at the same time, furnishes the sintered bearing with a predetermined porosity for accurately controlling the rate of flow of lubricant radially through the bearing to the journal surface.

Further objects and advantages will become apparent as the following description proceeds and the subject matter which I regard as my invention is pointed out with particularity in the claims annexed to and forming a part of this specification.

In carrying out the objects of my invention in one form thereof, I provide improved apparatus particularly suitable for forming and mounting bearings onto an end shield of an electric motor. This apparatus includes a holding or fixture assembly comprising a compressible collet and a housing for movably mounting said collet. Cooperating with the fixture assembly is a sizing and riveting assembly which includes a sizing pin and riveting surface. In the use of the apparatus, the bearing blank is placed within the collet and the end shield positioned over it. The sizing and riveting assembly is then moved relative to the fixture assembly to bring the sizing pin into the bore of the bearing blank and to bring the riveting surface against the upper end of the blank. Continued movement of the sizing and riveting assembly then causes riveting of the upper end of the blank over the end shield and concurrently causes compression of the split collet so as to squeeze the bearing blank between it and the sizing pin. This squeezing of the blank causes the bore of the bearing blank to be sized by the pin and results in a bore of accurate diameter throughout.

By a further aspect of the present invention, for those situations which require an extremely accurate control of the bearing body compression effected radially between the sizing pin and the collet; e.g., permeable sintered powdered bearings with predetermined lubricant metering characteristics, means such as a hydraulic assembly may be connected to the collet for moving it in an axial direction with a predesignated force to reduce the dimensional cross section of the collet recess a preselected amount. Once the bearing blank has been securely fastened to the end shield, a regulated axial movement (by such means) of the split collet and the housing relative to each other varies the actual side of the collet in a predetermined manner thereby radially compressing the bearing blank inwardly from the inner walls of the collet around and in intimate pressure contact with the sizing pin. This squeezing operation regulates the ultimate size of the capillary passages through the body of the blank to provide the finished bearing with a lubricant rate of flow path through the bearing body within the desired limits and, at the same time, forms the finished bearing with an accurately dimensioned cylindrical journal surface.

For a better and more complete understanding of the invention, reference should be had to the following description taken in conjunction with the accompanying drawings which illustrate the embodiments of the present invention.

In the drawings:

FIG. 1 is a partial side view in cross section of the improved apparatus in one form thereof with a motor end shield and bearing blank positioned on the fixture assembly, illustrating one step of the mounting procedure;

FIG. 2 is a similar view to FIG. 1 showing the next assembly step in the bearing mounting process, with the bearing bore being properly sized while the bearing is being fixedly mounted to the end shield;

FIG. 3 is a plan view, broken away in part of the end shield and bearing as positioned on the fixture, shown in FIG. 1, to illustrate more clearly the assembly fixture;

FIG. 4 is a perspective view, broken away in part, of the assembled end shield assembly after its removal from the assembly fixture, to illustrate more clearly the bearing mounting;

FIG. 5 is a side view, broken away in part of a pair of end shield assemblies, assembled with use of the novel apparatus of FIG. 1, as finally positioned on an electric motor;

FIG. 6 is a partial side view in cross section showing a second embodiment of the improved apparatus of the present invention, with an unfinished bearing blank and motor end shield in place on the fixture assembly and with the bearing attaching and sizing mechanism and the bearing holding and forming means in their respective raised or unoperated positions;

FIG. 7 is a similar view to FIG. 6 illustrating the bearing attaching and sizing mechanism and the bearing holding and forming means of the improved apparatus of FIG. 1 in their respective lower or operated positions; and FIG. 8 is a similar view to FIG. 6 showing the formed and finished bearing firmly attached to the motor end shield just prior to the removal of the end shield assembly from the apparatus, with the component parts of the improved apparatus in their raised positions.

Referring now to the drawings in more detail, one form of the improved apparatus of the present invention is illustrated in FIGS. 1–3 inclusive. As shown therein, fixture assembly or jig, generally indicated at 10, is provided for holding a sleeve type bearing blank 11 (to be described more fully hereinafter) while it is being formed into a finished bearing 11a and assembled onto end shield 12. The fixture 10 comprises a cast housing 13 and a bearing holding sleeve 14 movably mounted therein. Housing 13 consists of two cast members, a hollow cylindrical upper member 15 and base member 16, which are detachably secured together by any suitable means, such as by screw means 17. Upper member 15 is provided with a centrally disposed, longitudinally extending bore 18 having a beveled or inclined wall 19 formed at the upper entrance of the bore 18. The lower portion of member 15 is provided with an annular flange 20 having a pair of apertures or holes 21 and 22, adapted to cooperate with screw means 17. Base member 16, annular in configuration, is provided with a central chamber 23 which communicates with bore 18 of upper member 15. A pair of holes 24 and 25, adapted to receive screw means 17, are disposed in base member 16 in cooperative relation to the respective holes 21 and 22 provided in the flange 20, thus completing the means for securing together the two housing members.

The bearing holding sleeve 14 is slidably received in bore 18 of upper member 15. At its upper end, sleeve 14 is provided with a split collet portion 26, having three spaced apart sections 27, each formed with an outer inclined wall 28 for sliding engagement with wall 19 of bore 18. The inner walls 29 of each section 27 cooperate to define a central recess 30, which is formed with a lower shoulder 31 which is adapted to receive and retain the bearing blank 11. An energy storing device 32, positioned within chamber 23, is fastened to the lower portion 33 of sleeve 14 in any suitable manner, generally indicated at 34, and cooperates with collet portion 26 to form the bearing releasing means in a manner which will become apparent as the description proceeds. As shown, device 32 comprises a central horizontally extending arm 35 to which is fastened a biasing means in the form of a pair of spring members 36, one being secured at each end of arm 35. Further, the arm is attached, as by riveting, to a cap 37 which fits into the lower portion 33 of sleeve 14. The assembly fixture 10, which is portable in nature, is illustrated as being supported on a table 38.

A fastening and sizing assembly or mechanism 39 is movably positioned above fixture 10 and may be lowered and raised relative to the fixture by any suitable means (not shown), such as by a hydraulic cylinder. Mechanism 39 comprises a centrally disposed vertically extending shaft 40 having a fastening and sizing pin 41 formed at its lower end. Outer surface 42 of pin 41 is accurately dimensioned to the desired diameter size of the inner surface or bore 43 of the finished bearing 11a (the bearing being hereinafter described in detail). The upper portion of pin 41 is provided with a curved or riveting surface 44, the purpose of which will become more apparent as the description proceeds. Another assembly or mechanism 45, employed for aligning and holding the end shield in position during assembly, is independently movable relative to the mechanism 39 by any suitable means (not shown) and comprises a pair of squaring arms 46 and 47, which are spaced apart on a supporting bar 48 and are biased downwardly in any suitable fashion, such as by resilient cylinder 49. The aligning mechanism 45 cooperates with the fastening and sizing mechanism 39 to align the end shield 12 with bearing blank 11 and to remove the sizing pin 41 from the bore of the finished bearing 11a. An aperture 50 may be provided centrally of bar 48 and shaft 40 may project through aperture 50 in slidable engagement therewith. The significance of the various components of the afore-described novel apparatus will become more apparent as the description proceeds.

Turning now to the bearing blank 11 which may be conveniently formed and assembled onto end shield 12 by the present invention, the blank may be composed of any suitable material, such as bronze, and in its unfinished form, has an inner surface defining a bore 51 which need not be accurately dimensioned within small tolerance limits. In addition, the bearing blank 11 is formed with an outer diameter of reduced size 52 at one of its ends. End shield 12 is shown as being bell-shaped, suitable for use, for example, in totally enclosed motors, as shown in FIG. 5. The end shield has an aperture or hole 53, centrally located and adapted to receive the reduced end portion 52 of the bearing blank 11.

Now, the improved method and operation of the novel apparatus of FIGS. 1–3 inclusive will be described. Bearing blank 11 is initially placed in recess 30 of collet portion 26 of the fixture 10, in loose engagement thereto, with its end portion 52, of reduced outer diameter, facing upwardly. Mechanisms 39 and 45 are in their upper or raised position, as is sleeve 14. The end shield is thereafter arranged over the fixture 10, with the reduced end portion 52 of the bearing blank extending through end shield aperture 53. It should be noted that at this point, the bore 51 of bearing blank 11 is in substantial, axial alignment with sizing pin 41. Mechanism 45 is lowered until the lower ends 54 and 55 of arms 46 and 47 respectively press with equal force at spaced apart points 56 and 57 on the outer surface of end shield 12 (see FIG. 2), thereby squaring or axially aligning the end shield 12 with bearing blank 11. Mechanism 39 is also lowered so that sizing pin 41 enters bearing blank bore 51. The movement of mechanism 39 is continued after pin 41 enters the bore until riveting portion 44 contacts the upper end 58 of the bearing blank 11, which extends through the end shield 12. This action forces sleeve 14 downwardly, and with it, bearing blank 11. Springs 36, which are cooperatively connected with sleeve 14, are caused to become compressed, thereby storing energy. At the same time, due to the sliding and engaging cooperation between the incline walls 19 and 28 of the respective housing member and collet portion, the three sections 27 of the collet are forced tightly against the outer surface of the bearing blank 11 held therein. Thus, it can be seen that the bearing blank is compressed between the sizing pin 41 and walls 29 of the collet 26, and the blank is held, in effect, stationary within the collet recess, being formed into a finished bearing having an accurately dimensioned bore surface. Moreover, the curved or riveting portion 44 of the pin turns the upper end 58 of the bearing blank downwardly and rivets it firmly against the outer surface 59 of the end shield, thereby providing an especially strong mounting.

With bearing 11a properly sized and rigidly secured to the end shield, sizing pin 41 is then removed from the bearing. To remove the sizing pin, shaft 40 is raised while the arms 46 and 47 respectively still press downwardly on the outer surface of the end shield. Thus, it can be seen that since collet portion 26 still firmly holds finished bearing 11a, the raising of sizing pin 41 has the additional effect of wiping or burnishing the bore 43 of bearing 11a, thereby insuring a proper and smooth journal surface throughout its entire length. Due to the fact that the resilient members 49 have greater biasing strength than does device 32, the sleeve 14 will not move upwardly until after the arms 46 and 47 also have been raised out of contact with the end shield; however, once mechanism 45 has been raised, device 32 with its springs in the compressed position, pushes the sleeve 14 upwardly. The outer walls of collet portion 26, due to the internal resilience thereof, follow the contour of the upper housing walls 19 in sliding engagement therewith, thereby allowing the collet sections 27 to separate to release the bearing held therein. Therefore, an end shield assembly 60 is formed in which sleeve bearing 11a is permanently secured thereto. Assembly 60 may be removed from the fixture 10 merely by lifting it therefrom, without the need for additional force and, thus, the proper bore size, provided during the prior steps, is not adversely affected in any way. The assembled end shield assembly 60 is illustrated in FIG. 4, after its removal from the fixture.

FIG. 5 shows a pair of end shield assemblies, assembled with the use of the novel apparatus, as used in an electric motor 61 of the totally enclosed type in common use today. The end shield assemblies, as employed in this or other machines, provide a machine with an improved operating performance due to the advantageous bearing characteristics.

It will be readily apparent from the foregoing that the present invention produces an end shield assembly in which a bearing is accurately positioned and fixedly secured to the end shield, with a minimum of variation between end shield assemblies. With proper motor assembly techniques, these end shield assemblies may be used to give superior alignment between the bearings and the rotor shaft in the assembled motor, enhancing machine performance. In addition, a bearing blank may be used in which a minimum amount of machining is required, since the various dimensional tolerances are not especially critical due to the fact that the assembly apparatus absorbs the tolerance differences. Moreover, the inner diameter or bore surface of the finished bearing is automatically sized and burnished to an accurate dimension throughout its length for rotatably carrying the rotor shaft with a minimum of interference therewith. Furthermore, since the bearing is released from the assembly fixture without the use of any force at its inner end, it is insured that the bearing will retain the accurately dimensioned bore surface provided during prior assembly steps. In addition, the bearing may now be satisfactorily supported in a fixed and rigid manner without the use of expensive and complex bearing mounts.

FIGS. 6–8 inclusive illustrate a second embodiment of the present invention. As shown therein, the improved apparatus includes a fixture or holding assembly 70 and a bearing fastening and sizing assembly or mechanism 71, movably disposed above (as viewed in the drawings) fixture 70 in a predetermined fashion. Fixture 70 comprises a stationary cast housing 72, formed at its base with a flange portion 73 for mounting the fixture to a stationary frame or table, identified at 74, by any conventional means; e.g., bolts 75. A central bore 76 is provided in housing 72, extending from upper wall 77 of the housing to a lower chamber 78 provided at the bottom portion of housing 72. At its upper entrance, bore 76 is constructed with an enlarged frusto-conical shaped inclined wall 79 which becomes larger in diameter as it approaches the upper housing wall 77.

A sleeve member 80 is slidably received in housing bore 76 and, as in the embodiment of FIGS. 1–3 inclusive, is furnished with a split collet portion 81, consisting of a plurality of spaced apart resilient sections, biased away from the center of the sleeve and integrally joined at their inner ends. The sections of collet portion 81 have inner walls 82 which define a substantially cylindrical surface having a countersunk entrance, as shown at 83. The outer walls 84 of the collet are of sloped configuration of sliding cooperative engagement with the inclined wall 79 of housing 72. Preferably, in its raised or expanded (unoperated) position, as shown in FIG. 6, the upper end of collet portion 81 extends axially above housing wall 77. The extreme bottom of sleeve member 80 is formed with an integral flange 85 projecting inwardly to support a central tube 86 within sleeve 80, the tube extending up to collet portion 81 of the sleeve. The upper end of tube 86 and the inner axial walls 82 of split collet portion 81 define a bearing accommodating recess 87. Thus, it will be seen that sleeve 80 and tube 86 are capable of axial movement as a unit within housing bore 76. The bottom of sleeve 80 is provided with means for moving sleeve 80 and tube 86 in either axial direction with a predetermined force. The illustrated means is a conventional type hydraulic cylinder 88 having a piston 89 for driving a piston rod 90 which in turn is fixedly connected, as by a threaded construction generally identified by reference numeral 91, to the lower end of sleeve 80. If desired, a set screw 92 may be used to insure a firm connection between the piston rod and sleeve 80.

The bearing fastening and sizing mechanism 71 in the second embodiment is, in effect, a vertical disposed shaft (as viewed in the drawings) capable of being lowered and raised relative to fixture 70 by any conventional means; e.g. a hydraulic cylinder (not shown). The lower end of mechanism 71 is a sizing pin 93, preferably having an axial length slightly greater than the length of the bearing bore to be formed and having an outer surface accurately dimensioned to the desired bearing bore size. In addition, directly above pin 93, mechanism 71 is furnished with a curved pressure applying surface 94 and a straight surface 95, substantially perpendicular to the axis of pin 93.

In order to illustrate the way the apparatus of FIGS. 6–8 inclusive operates, it is shown forming a sleeve type bearing blank 96, substantially cylindrical in shape, having an unfinished bore 97 and assembling the bearing blank onto a relatively small stamped-out end shield member 98 of sheet material of the type generally used in fractional horsepower motors. As illustrated, bearing blank 96 is of the molded porous powdered sintered variety, composed of any suitable bearing material, such as ninety parts copper, ten parts tin and one part graphite. The porosity of the blank is such that capillary passages are provided radially through the body of the blank, from its outer circumferential surface to bore 97.

Referring now to the operation of the apparatus of the second embodiment, FIG. 6 shows the individual components of the apparatus in their unoperated or raised positions. Bearing blank 96 is initially placed in collet recess 87, blank bore 97 being in coaxial relation with pin 93. It should be noted that blank 96 is loosely received by collet portion 81 and has its upper end 99 projecting beyond the countersunk entrance 83 of collet recess 87. End shield member 98 is then arranged over the bearing blank with the extreme end 99 of blank 96 extending through a suitable bearing receiving hole 100 provided centrally of end shield member 98. Preferably, hole 100 is greater in diameter than the outer circumferential surface diameter of bearing blank end 99 by a small amount. For relatively small end shields such as that shown, the end shield and bearing blanks may be conveniently aligned by making the extreme end of the collet substantially perpendicular with respect to the axis of pin 93 and of sufficient radial width to support the end shield in the desired relation relative to bearing blank 96 without the use of other aligning and holding means. For larger sized end shields; e.g., the type used on small horsepower motors, an end shield aligning and holding assembly, such as mechanism 45 previously described for the first embodiment, may be advantageously employed.

Mechanism 71 is lowered relative to fixture 70 so that sizing pin 93 enters blank bore 97, and surface 94 contacts the entrance of the bore, forcing sleeve 80, tube 86, and blank 96 to move downward in housing 72. Consequently, as the split collet portion 81 slides along inclined housing wall 79, the individual collet sections will be forced into tight engagement with the outer surface of blank 96, compressing the blank between the collet and pin 93. Continued downward movement of mechanism 71 causes shaft surface 95 to produce a thrust receiving face 101 (FIG. 7) substantially perpendicular to the longitudinal axis of bearing bore 97 while shaft surface 94 forms a recess 102 (see FIG. 7) for carrying a bead of lubricant adjacent thrust receiving face 101. In addition, the shaft surfaces 94 and 95 cooperate with the collet to fasten blank end 99 to the end shield. More specifically, due to the inherent ductility of the sintered bearing blank, a shoulder will be provided in firm engagement with each side of the end shield, adjacent hole 100, to stake or swedge the blank onto end shield member 98 in a rigid fashion. As seen in FIG. 7, the countersunk entrance 83 of collet portion 81 provides a space for receiving and forming the lower bearing blank shoulder.

At a predetermined point in the downward travel of mechanism 71, for example, just prior to the engagement of surface 94 with blank 96, hydraulic cylinder 88 is actuated by any suitable means, such as the contact of a shoulder 103 provided on mechanism 71 with a microswitch 104 which in turn starts operation of the hydraulic cylinder 88 in the well-known way (not shown). Fluid will be transferred into the top section of the cylinder (in the direction of the arrow in FIG. 7), under a predetermined pressure to move piston 89 in a downwardly direction with the desired force. Through the intermediaries of piston rod 90 and attached sleeve 80, collet portion 81 will also be lowered relative to housing wall 79, reducing the cross section area of collet recess 87, until the blank is compressed radially with the desired amount of force between pin 93 of mechanism 71 and collet wall 82. The operated positions or lower limit of travel for both mechanism 71 and the compressed position for the component parts of fixture 70 is illustrated by FIG. 7. Preferably, the actual staking of the bearing blank to the end shield just described is accomplished at some point in time prior to the final compression of the bearing body radially between pin 93 and collet wall 82 achieved by the complete axial displacement of collet 81 relative to housing 72. This squeezing operation controls the size of the capillary passages; i.e., degree of porosity, in the bearing body within very narrow limits to provide the finished bearing with an accurately controlled lubricant rate of flow radially through the bearing body by capillary action. It will be appreciated, of course, that the pressure applied by the fluid to piston 89 determines the ultimate total porosity or lubricant flow rate which will be "built" into the bearing, regardless of the slight variation of porosity existing between individual bearing blanks so that the finished bearings will all have a substantially uniform total porosity.

Once the foregoing manufacturing compression operation has been accomplished, the flow of fluid into hydraulic cylinder 88 may be reversed (as indicated by the direction of the arrows in FIGS. 7 and 8) by any suitable means (not shown) well known in the art. Thus, the fluid in the top section will be removed from cylinder 88 and fluid will enter the bottom cylinder section under pressure, causing piston 89 to move toward the top of the cylinder. This action moves rod 90 and collet portion 81 from the lower compressed position of FIG. 7, attached sleeve 80, in an upward direction to the upper extended or original position shown by FIGS. 6 and 8. Thus, the manufactured end shield assembly, identified at 105 in FIG. 8, which consists of formed bearing 96a and end shield member 98, will be raised along with collet 81. Because the individual sections of collet 81 are resiliently biased away from the center of sleeve 80 and each has an outer wall substantially conforming to the incline of housing wall 79, as sleeve 80 is raised relative to housing 72, the inner wall 82 of the individual collet sections will move away from the outer circumferential surface of the formed bearing to release it from collet recess 87.

Simultaneously with the reverse operation of cylinder 88 described above, mechanism 71 is preferably returned to its original position of FIG. 6 by any suitable means and in so doing sizing pin 93 will carry with it bearing 96a and the end shield assembly 105. In order to remove or strip formed bearing 96a from sizing pin 93, a pair of spaced apart stationary stripping arms 106 are provided, the arms being adapted to straddle the bearing. The lower end of each arm is composed of a small permanent magnet 107, the bottom surfaces 108 of the respective magnets together forming a plane substantially perpendicular to the axis of pin 93. Thus, as mechanism 71 travels upward, (broken lines in FIG. 8), magnets 107 contact end shield member 98 and prevent end shield assembly 105 from further upward movement. Continued upward travel of mechanism 71, to the position shown by the solid lines in FIGS. 6 and 8, removes pin 93 from the bore of bearing 96a thereby wiping or burnishing the bore into a smooth finished journal surface. Mechanism 71 may be rotated, if desired, during its descent from the raised position as well as during the burnishing step just outlined. The end shield assembly, temporarily held by magnets 107, may be conveniently removed thereafter from the apparatus without the need for additional forces which would tend to destroy the finished bearing bore provided by the prior manufacturing steps. The apparatus is then ready to form and assemble the next bearing blank and end shield member.

I have found it desirable, when mounting and forming sleeve bearings having relatively short axial lengths as compared with their radial wall thicknesses, to secure the bearing blank firmly to the end shield without an application of a radial compressive force, on the body portion of the blank disposed within the collet recess 87, of sufficient magnitude to produce the finished bearing. For example, I have determined that in forming a sintered bearing having an axial length to wall thickness ratio of 1.5 or less, stresses introduced by the staking step are transmitted axially through the blank body and, in combination with the radial compressive forces required for the final squeezing operation, tend to produce a frusto-conical shaped bore which cannot always be corrected or reformed by subsequent operations.

Consequently, in order to insure the fabrication of a substantially cylindrical journal surface in blanks within the critical length to wall thickness ratio range and using the permeable sintered blank 96 as an exemplification, it is preferably initially to stake blank end 99 to the end shield 98 in a rigid manner and concurrently to produce thrust face 101 by lowering assembly 71 from its raised position shown in FIG. 6 to its operated position illustrated in FIG. 7. During the staking step, with cylinder 88 still in its raised position (see in FIG. 6) relatively little radial compressive force will be applied by collet 81 to the outer walls of blank 96 due to the position of cylinder 88 which is connected to the collet. Thereafter, the pressure on blank 96 may be relieved, for example, by raising assembly 71 upwardly out of pressure engagement with the extreme end surface of blank 96. This pressure relief may be accomplished satisfactorily by an extremely short movement of assembly 71 in the upward direction, in other words, a slight backing off of the assembly from the staked end of blank 96 while still having the accurately formed peripheral surface of pin 93 extending axially through the blank bore or downwardly beyond the confines of collet recess 87.

Thereafter, with pin 93 projecting beyond the blank bore and with the axial pressure relief of the blank, cylinder 88 may be actuated to lower collet 81 in assembly 105 a predetermined distance to its operated position (FIG. 7) thereby reducing the cross section area of the collet recess 87 and effecting a radial compression of the blank inwardly from collet walls 82 to pin 93 with the preselected force. This action regulates the ultimate size of the capillary passages through the body of the blank to provide a finished bearing with a lubricant rate of flow through the body within the desired range. At the same time, an accurately dimensioned substantially cylindrical journal surface is insured. Once the foregoing procedure has been effected, the remaining manufacturing steps may continue in the same fashion as previously described for the embodiment of FIGS. 6–8 inclusive.

A unitary lubricant reservoir of the type disclosed and claimed in Patent No. 2,959,696 issued to M. D. Tupper and K. M. Feiertag on November 8, 1960 and assigned to the same assignee of the present application, may be mounted over the end of the bearing, which was contained in the collet recess 87. Therefore, the controlled porosity of the formed bearing will be located at the precise location where the lubricant reservoir surrounds the bearing. A pair of end shield assemblies, built in accordance with the foregoing, may be incorporated in an electric motor in a similar manner to that illustrated by FIG. 5 for end shield assemblies produced by the first embodiment.

It will be recognized from the foregoing that the apparatus of the second embodiment has the same inherent advantages as the apparatus of the first embodiment previously outlined. In addition, it is capable of producing a formed bearing having a highly controlled degree of porosity without requiring the employment of expensive equipment.

It should be apparent to those skilled in the art, while I have shown and described what at present is considered to be the preferred embodiments of my invention in accordance with the patent statutes, changes may be made in the structure disclosed without actually departing from the true spirit and scope of this invention, and I therefore intend to cover in the following claims all such equivalent variations as fall within the invention.

What I claim as new and desire to secure by Letters Patent of the United States is:

1. Apparatus for forming and assembling a sleeve type bearing onto a bearing support having an aperture for receiving one end of the bearing in an unfinished state, comprising a holding assembly including a housing member having a bore with inclined walls, said walls being dimensionally greatest at the entrance of the bore; a collet member having a plurality of spaced apart sections arranged in sliding engagement with and movable relative to said inclined walls, said sections together forming a recess therein for accommodating the other end of the unfinished bearing; said cooperating collet and housing members including an upper extended position, an intermediate bearing holding position, and a lower bearing bore reducing position, the diameter of said collet recess being greater than the outer diameter of the other end of the unfinished bearing when said collet member is in said upper extended position; a shaft including an elongated pin accurately formed to a predetermined diameter; said shaft having a raised position with said pin arranged beyond the confines of said recess, a pressure applying position, and an intermediate pressure relieving position, with said pin arranged in and extending the entire length of the collet recess surrounding the other bearing end in the latter two positions; said shaft being movable between said positions thereof; actuating means operatively connected to one of said members for providing relative movement therebetween first to said intermediate holding position and then to said lower bore reducing position; said shaft having a pressure applying surface for attaching the one end of the bearing to the bearing support while said collet member holds the other bearing end when in said holding position, said collet recess having a predetermined inner diameter when in said lower position to compress the bearing radially around said pin with a selected force to size the bearing bore; means causing said collet member and shaft to be moved independently to said upper extended and raised positions respectively for releasing the formed bearing attached to the support from said collet recess; and means preventing upward movement of the support and attached bearing as the shaft is moved into said upper extended position to remove the pin from the bearing bore.

2. Apparatus for forming and assembling a porous sintered sleeve type bearing onto a support having an aperture for receiving one end of the bearing in an unfinished state, comprising a holding assembly including a housing member having a bore with inclined walls, said walls being dimensionally greatest at the entrance of the bore; a collet member having a plurality of spaced apart sections arranged in sliding engagement with and movable relative to said inclined walls, said sections together forming a recess therein for accommodating the other end of the unfinished bearing; said collet member having an upper extended position, an intermediate bearing holding position, and a lower bearing porosity reducing position, the diameter of said collet recess being greater than the outer diameter of the other end of the unfinished bearing when said collet member is in said upper extended position; a shaft having an elongated pin accurately formed to a predetermined diameter corresponding to the finished diameter of the bearing bore, said shaft having a raised position with said pin arranged beyond the confines of said recess, a pressure applying position, and an intermediate pressure relieving position, with said pin arranged in and extending the entire length of the collet recess surrounding the other bearing end in the latter two positions; said shaft being movable between said positions thereof; and actuating means operatively connected to said collet member for moving said collet member first to said intermediate holding position and then to said lower porosity reducing position; said shaft having a pressure applying surface for attaching the one end of the bearing to the support while said collet member holds the other bearing end when in said holding position, said collet member having a predetermined inner diameter when in said lower position to compress the bearing radially around said pin with a selected force to form the body of the bearing with a porosity of predetermined limits and concurrently size the bearing bore; said collet member and shaft being adapted to be moved to said upper extended and raised positions respectively for releasing the formed bearing attached to the support from said collet recess.

3. Apparatus for forming and assembling a bearing on an end shield for use in a dynamoelectric machine, comprising a fixture assembly including a housing having a bore with inclined walls at the upper entrance thereof, a member movably disposed in said housing bore formed with a split collet having a plurality of spaced apart sections arranged in sliding engagement with said inclined walls, said sections together defining a recess therein for accommodating a bearing blank, said collet having an upper extended position and a lower compressed position in said housing bore, a shaft including an elongated pin accurately formed to a diameter corresponding to the finished diameter of the bearing bore, said shaft having a raised position with said pin arranged beyond the confines of said recess and a pressure applying position with said pin arranged in and extending the entire length of the collet recess surrounding the bearing blank; the shaft being movable between said positions; actuating means operatively connected to said split collet for moving said collet first to said compressed position and then to said raised position; said shaft having a pressure applying surface for attaching the one end of the bearing blank to the end shield while said collet holds the bearing blank when adjacent said compressed position; said collet recess including a predetermined inner diameter when in said lower position to compress the bearing radially around said pin with a selected force to form the bearing with a porosity within certain limits and concurrently to size the bearing bore into a finished journal surface; said collet and shaft being adapted to be moved to their respective upper extended and raised positions for releasing the formed bearing attached to the end shield from said collet recess.

4. Apparatus for forming and assembling a bearing on an end shield for use in a dynamoelectric machine, comprising a fixture assembly including a housing having a bore with inclined walls at the upper entrance thereof, a member movably disposed in said housing bore formed with a split collet having a plurality of spaced apart sections arranged in sliding engagement with said inclined walls, said sections together defining a recess therein for accommodating a bearing blank, said collet having an upper extended position and a lower compressed position in said housing bore, a cooperating assembly for sizing the bore in said blank and for fastening said blank onto an end shield having an aperture for receiving one end of said blank, said cooperating assembly including a pressure applying surface and a pin protruding axially beyond said surface accurately formed to a predetermined outer diameter, said cooperating assembly being movable between raised and lowered positions, said pin being received with the bore of said bearing blank and said pressure applying surface engaging the upper end of said bearing blank when said cooperating assembly is in said lowered position, means operatively connected to said collet for moving said collet between said upper extended position and said lower compressed position independently of the movement of said cooperating assembly, said collet recess including a predetermined inner diameter when in said lower position to compress the bearing radially around said pin with a selected force to form the bearing with a porosity within certain limits and concurrently size the bearing bore into a finished surface; said collet and cooperating assembly adapted to be moved independently of one another to said upper and raised positions for releasing the formed bearing attached to the end shield from said collet recess; and means preventing upward movement of the end shield as said cooperative assembly is moved into said upper extended position to remove the pin from the bearing bore.

5. Apparatus for forming and mounting a bearing on a support having an aperture for receiving one end of the bearing in its unformed state comprising a holding assembly including a housing having a bore with inclined walls, a collet member having a plurality of spaced apart sections arranged in sliding engagement with said inclined walls, said sections together forming a recess therein for receiving and compressing the other end of the unformed bearing, a shaft including an elongated pin accurately formed to a predetermined diameter, said shaft having a raised position with said pin arranged beyond the confines of said recess and a pressure applying position with said pin arranged in and extending the entire length of the collet recess surrounding the bearing blank; the shaft being movable between said positions; actuating means operatively connected to one of said members for moving one relative to the other first to said lower position and then to said upper position; said shaft having a pressure applying surface for attaching the end of the bearing blank to the bearing support while said collet member holds the other bearing end when adjacent said compressed position; said collet recess including a predetermined inner diameter formed in said lower compressed position to compress the bearing radially around said pin with a selected force to size the bearing bore into a finished journal surface; said collet member and shaft being adapted to be moved independently into said upper and raised positions respectively for releasing the formed bearing attached to the support member from said collet recess; and means preventing upward movement of the support and attached bearing as said shaft is moved into said upper position to remove the pin from the bearing bore, said latter means including at least two spaced apart arms disposed adjacent said shaft for engaging the support member on either side of the bearing with said arms and shaft being independently movable relative to each other.

References Cited by the Examiner

UNITED STATES PATENTS

| | | | |
|---|---|---|---|
| 748,816 | 1/04 | Terry | 78—52 |
| 873,640 | 12/07 | Waddington | 78—52 |
| 1,377,094 | 5/21 | Root | 78—60 |
| 1,403,529 | 1/22 | Wentworth | 78—52 |
| 1,415,745 | 5/22 | Washburne | 78—52 |
| 1,664,904 | 4/28 | Stanek | 78—15 |
| 1,706,118 | 3/29 | Hopkins | 78—63 |
| 1,750,290 | 3/30 | Valentine | 78—60 |
| 2,337,742 | 12/43 | Dittmar | 29—512 |

FOREIGN PATENTS 93,446   7/43   Austria.

WILLIAM J. STEPHENSON, Primary Examiner.

WILLIAM W. DYER, CHARLES W. LANHAM,
Examiners.